Dec. 29, 1970 R. G. GODDING 3,551,805
GRANULAR MATERIAL MEASURING APPARATUS HAVING A
COMPRESSION AND MOISTURE CONTENT SENSING CELL
Filed July 18, 1966 5 Sheets-Sheet 4

INVENTOR:
Ronald George Godding
By
Karl W. Flocks
Attorney

United States Patent Office 3,551,805
Patented Dec. 29, 1970

3,551,805
GRANULAR MATERIAL MEASURING APPARATUS HAVING A COMPRESSION AND MOISTURE CONTENT SENSING CELL
Ronald George Godding, Birmingham, England, assignor to The British Cast Iron Research Association, Birmingham, England, a British company
Filed July 18, 1966, Ser. No. 566,142
Claims priority, application Great Britain, July 24, 1965, 31,670/65
Int. Cl. G01r 27/04
U.S. Cl. 324—58.5                                    7 Claims

ABSTRACT OF THE DISCLOSURE

A device for the measurement of moisture content of granular materials is provided in which a sample of sand is subjected to compression in a long, narrow cell, open at one end, up to a predetermined minimum pressure corresponding to a packing density which is substantially constant irrespective of moisture content. An electrical characteristic of the sand which varies as a known function of water content—preferably absorption of microwave power—is then measured while under this pressure. Finally, the sample is ejected, and may be returned to its original source.

---

This invention relates to the measurement of moisture content of granular materials which, in the mass, are capable of taking up water in the interstitial spaces and which are capable of compression to a higher constant or approximately constant packing density and, when so compressed, exhibit a degree of cohesion. A typical example of such materials is sand, especially foundry moulding sand. In this specification, unless repugnant to the context, the term "sand" is to be understood as meaning any granular material having the foregoing properties.

In the specification of our earlier patent application No. 255,032 now Pat. No. 3,348,140 there are described a method of and apparatus for maintaining a continuous determination of moisture content of granular materials, such as moulding sand, in which a plurality of successive batches of the sand are subjected at any one time to a predetermined pressure sufficient to ensure approximately constant packing density of the sand, notwithstanding variations in its water content, and an electrical characteristic of the compressed sand which is variable as a known function of the water content is utilised to afford a measure of the water content.

The successive batches for compression are abstracted at a relatively high rate from a source of the sand, and as each new batch is fed into one end of the measuring cell and compressed, a previously compressed and measured batch is ejected from the other end. Since there are always more than one batch in the cell at any one time, to constitute a charge, the measuring process is in the nature of a continuous averaging process. The apparatus is capable of a high degree of accuracy but it is relatively complicated and expensive.

One of the electrical characteristics mentioned in our earlier specification as forming the basis for a moisture content measurement is the ability of the compressed material to absorb microwave power.

The apparatus of our earlier invention effectively provides continuous determination of moisture content of sands and like granular materials, but it is not always necessary for moisture content determinations to be continuous. It is an object of the present invention to provide a simple and robust design of instrument for sampling a source of sand and measuring the moisture content of successive batches.

In a preferred method, in accordance with the present invention, a sample of sand is subjected to compression in a long, narrow cell, open at one end, up to a predetermined minimum pressure corresponding to a packing density which is substantially constant irrespective of moisture content. An electrical characteristic of the sand which varies as a known function of water content—preferably absorption of microwave power— is then measured while under this pressure. Finally, the sample is ejected, and may be returned to its original source.

The axis of transmission of the microwave beam is arranged along the narrow dimension of the cell at a point remote from the open end of the cell and from the source of compression pressure.

Advantageously, the cell is of uniform cross-section and is traversed along the long dimension by a loading and discharge plunger which is displaceable between a limit position in which it closes the entry to the cell and a limit position in which it defines the end wall of the cell remote from the entry. A compression plunger conveniently forms the roof of the cell and is reciprocable towards and away from the floor thereof, usually (but not essentially) in a direction at right angles to both the line of displacement of the loading and discharge plunger and the axis of the microwave beam.

If desired, the cell may be mounted with its open end permanently in register with a sampling aperture in the wall of a vessel containing the sand—for example, a sand mill.

A practical embodiment of the present invention will now be described, by way of example only, with reference to the accompanying drawings in which.

Figure 1:
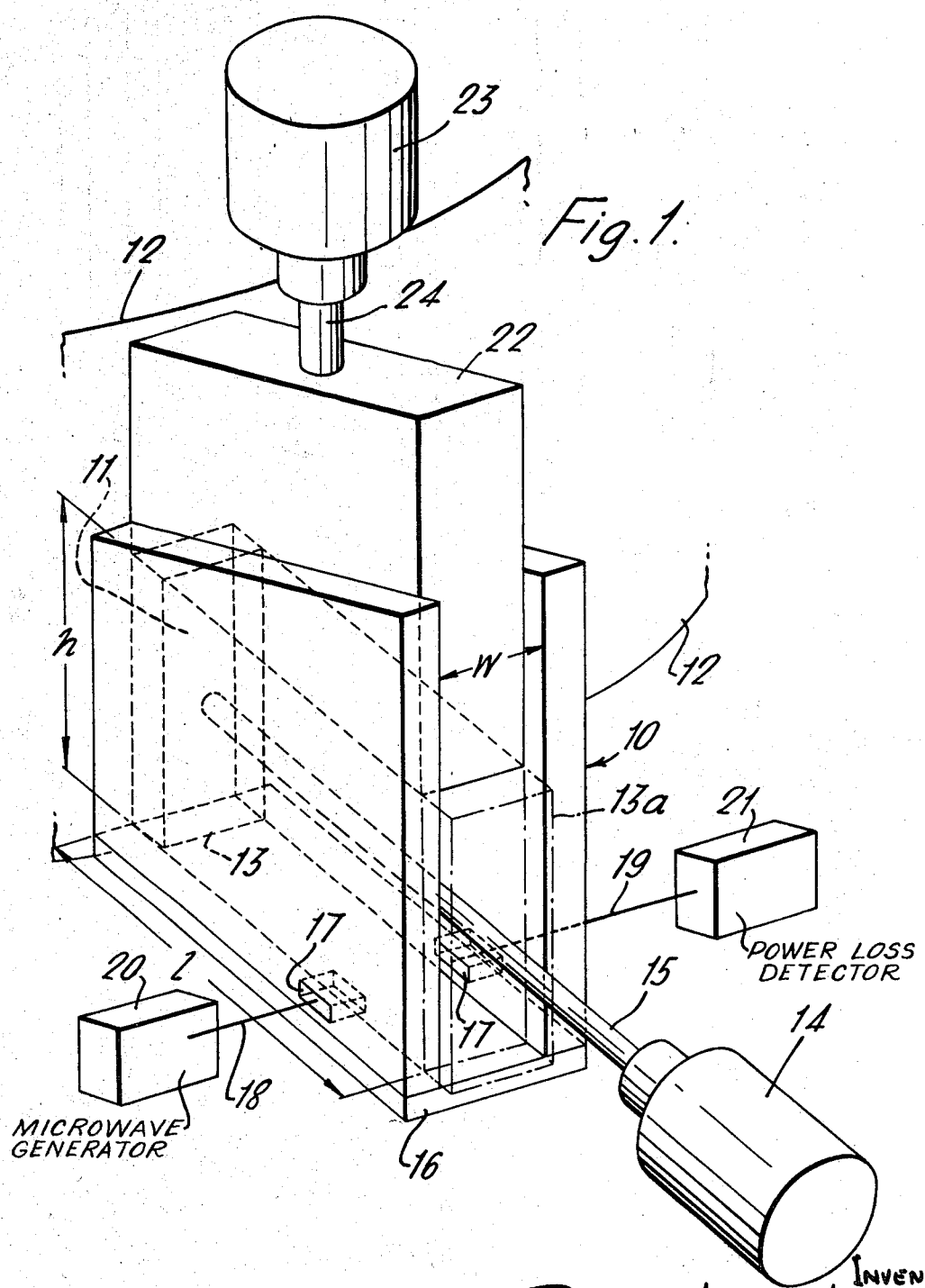
FIG. 1 is a diagrammatic perspective view of a sand hygrometer illustrating the principle of operation thereof.

The instrument shown diagrammatically in FIG. 1 consists essentially of a long, narrow open-ended box 10 having its narrow dimension $w$ much less than its long dimension $l$, and less than its working height $h$. The open front end 11 of the box constitutes both the entry and discharge opening, and is adapted to register with an aperture (not shown) in the wall 12 of a source of the sand of which the moisture content is to be measured. In FIG. 1, this source is represented as the drum or casing of a sand mill such as is used in foundries.

The working length $l$ of the box is defined by the stroke of a plunger 13 which is a close sliding fit within the box, the dotted line position illustrated representing the forward or inner limit of the plunger stroke and the chain line position 13a representing the backward or outer limit of the stroke. The plunger 13 is moved by an hydraulic or pneumatic cylinder 14 and ram 15. Adjacent the closed base or floor 16 of the box, and slightly forward of the outer limit position 13a of the plunger 13, each side wall of the box 10 has a window 17 constituting the terminal of a respective waveguide (represented by the line 18 or 19) along which is passed microwave energy from apparatus 20 including a generator to a power loss detector 21.

In the top of the box 10 is fitted a compression plunger 22 driven by an hydraulic or pneumatic cylinder 23 and ram 24. In its upper limit of travel shown, this compression plunger 22 permits the free passage of the loading and discharge plunger 13 along the cell which is defined by the internal surfaces of the base and side walls of the box 10, the underface of the compression plunger 22, and the inner face of the plunger 13 when in its outer or retracted position 13a. This latter position is such that the compression plunger can move slightly downwards across the inner face of the plunger 13. The pressure fluid circuits to the cylinders 14, 23 are controlled by valves (described hereinafter with reference to FIG. 6) which operate in such a way as to prevent fouling of either plunger 13, 22 by the other.

In use, the box 10 is suitably mounted on the wall 12 and the loading and discharge plunger 13 is advanced to its forward limit position to close the cell and seal the sand entry aperture at its front end. When a measurement is to be made, the plunger 13 is retracted to its outer limit position 13a and sand is allowed to enter the cell and substantially to fill it so as to constitute a charge whose moisture content is to be measured. When the cell is full, pressure fluid is admitted to the cylinder 23 and the compression plunger 22 compresses the charge under substantial pressure. Since the entry aperture at the forward end of the cell is not closed, some sand at this end may fall back into the mill drum 12, but the fraction which is thus lost constitutes a very small proportion of the whole charge, and the compression in the residual sample, and particularly that part which lies adjacent the plunger 13 and between the windows 17, is not affected. Consequently, the effective charge will normally be less in volume than the capacity of the measuring cell, and it is the residual sample which remains in the cell after the application of the substantial compression pressure which is deemed in this specification to be the charge and constitutes a sample of the sand under examination.

When the pressure in the charge has reached the predetermined value (greater than 300 lb./in.$^2$ for foundry sand) at which maximum packing density in the charge is achieved, the generator in the apparatus 20 is switched on and the power loss in the beam, due to absorption by moisture as it traverses the compressed charge between the windows 17, is measured by the detector 21.

The loss of sand during compression by crushing at the open entry end of the box 10 is allowed for in the choice of proportions of length $l$ to width $w$ and free height $h$ of the measuring cell, which are calculated to ensure that the residual charge at least in the vicinity of the windows 17 experiences the full compression pressure and becomes packed to its maximum packing density. In this way a simpler apparatus results, in that it is not necessary to provide some form of movable shutter or door to be interposed between the charge in the cell and the source 12 of that charge.

Figure 2:
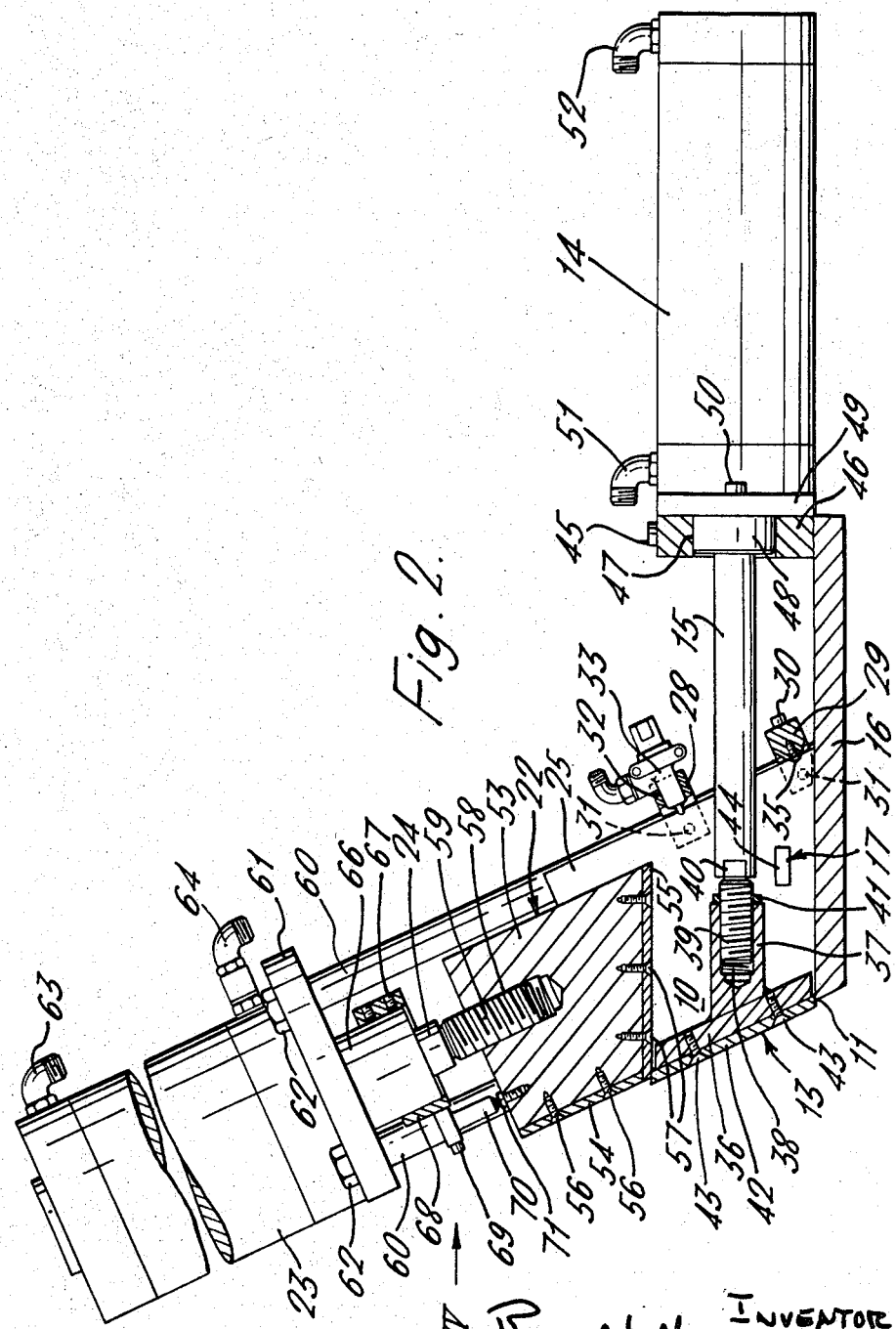
FIG. 2 is a side view, partly in section on the line II—II of FIG. 3 and partly broken away, of a practical design of hygrometer, omitting the measuring and control systems.
Figure 3:
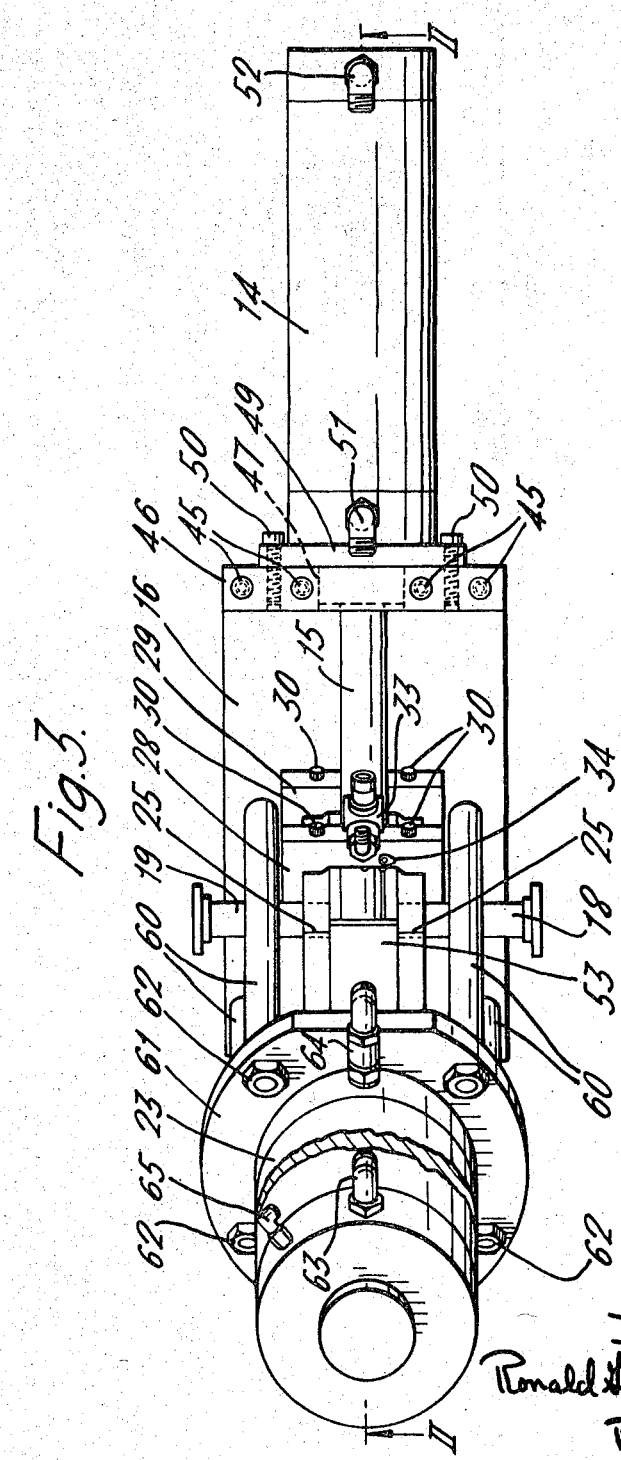
FIG. 3 is a plan view of FIG. 2.
Figure 4:
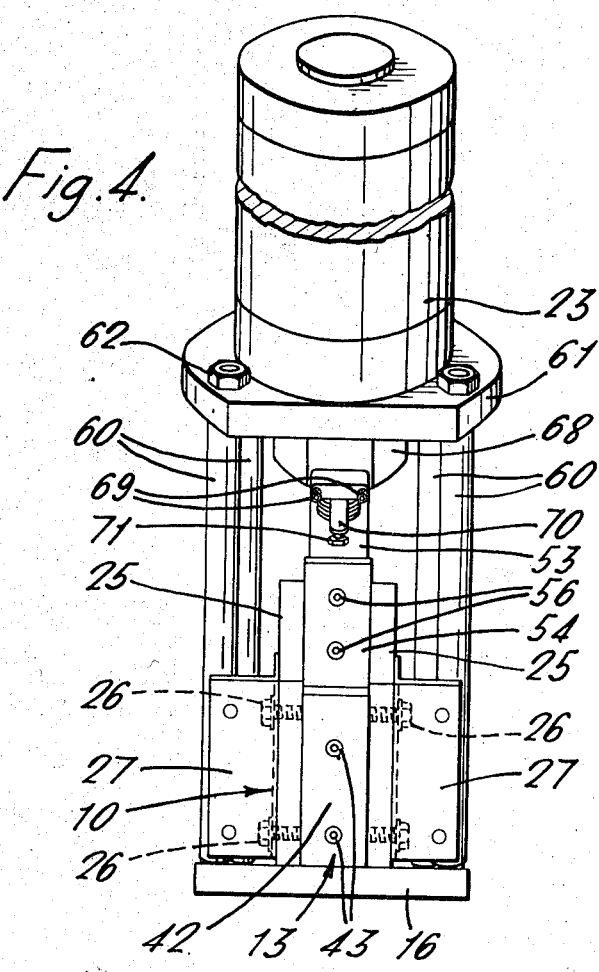
FIG. 4 is a view on the arrow IV of FIG. 2.

Referring now to FIGS. 2 to 4, the floor 16 of the box 10 is constituted by a portion of a plate on which the cylinders 14 and 23 are mounted and to which the sides 25 of the box are secured, preferably detachably. The axes of the cylinder 23 and its ram 24 and of the cylinder 14 and its ram 15 are inclined to one another at an obtuse angle, that shown being 120°. The lower edges of the sides 25 and the edges flanking the sand entry of the box and at the rear of the box are inclined at the same angle. At the front of the box the sides 25 extend upwards a short distance beyond the top of the plunger 13 when in its forward or fully advanced position, whilst the upper edges of the sides extend at right angles to the front edges. Thus when the compression plunger 22 is retracted to the uppermost position, its lower end is flanked by the tops of the sides 25 of the box 10.

Secured to the sides of the box by screws 26 are respective brackets 27 by means of which the box, together with the cylinders, may be mounted on the wall of the source of sand (not shown in FIGS. 2–4). It will be understood that, with a vertical wall, the floor 16 of the box will slope downwards from the entry aperture in the wall at the angle between the axes of the rams 15 and 24. This angle, which may vary according to circumstances, is chosen to ensure ready flow of the sand from the source into the measuring cell.

Set transversely of the box at the rear thereof are two spaced U-shaped saddles 28, 29 the limbs of which engage the outer surfaces of the sides 25 of the box, to which they are secured by screws 30 and 31. The saddle 28 has a central aperture 32 into which is fitted a cylindrical housing of a push-button-operated valve 33 secured in position by a grub screw 34, the valve being adapted to exercise a control function as described hereinafter. Carried by the saddle 29 are several mushroom-headed screws 35 with which the rear face of the plunger 13 engages when the plunger is at its outermost or fully retracted position. By preventing contact between the plunger face and the opposed face of the saddles, the screws 35 tend to inhibit trapping of sand particles between these faces.

The plunger comprises a head-piece 36 and a shank 37 set substantially centrally of the head-piece at an angle such that with the shank coaxial with the ram 15 the front face of the head-piece is parallel to the plane of the sand entry aperture at the front of the box. The shank 37 is formed with a threaded bore 38 into which is screwed the threaded end 39 of the ram 15. The ram is formed with diametrically opposite flats 40 for ease of rotation to adjust the relative axial positions of the plunger 13 and the ram 15. A locknut 41 enables the plunger and ram to be locked in any adjusted position. The head-piece 36, which is so dimensioned that there is a small clearance between its periphery and the box, carries a wear-resistant facing 42 which fits the box 10 and is held to he head-piece by countersunk screws 43. As shown by FIGURE 2, when the plunger is in its foremost position the facing 42 lies partly within the box.

The respective windows 17 in the sides 25 of the box are plugged with blocks 44 of hard insulating material to stop the ingress of sand and extending away from the two windows are the respective waveguides 18 and 19 referred to hereinafter.

Secured to the rear of the plate forming the floor 16 of the box by screws 45 is a block 46 formed with an aperture 47 for the reception of the stuffing box 48 of the ram 15. The cylinder 14 has at its forward end a flange 49 held to the block 46 by screws 50. Pressure fluid connectors 51 and 52 are provided respectively at the front and rear of the cylinder 14.

The plunger 22 comprises a block 53 formed with front and rear faces parallel to the axis of the ram 24, an upper face normal to the ram axis, and a lower face parallel to the floor 16 of the box 10. The width of the block is slightly less than the width of the box and the front and lower faces are faced with wear-resistant plates 54 and 55 held to the block 53 by countersunk screws 56 and 57 and of a width to fit the box. The block 53 is formed with a threaded aperture 58 into which the threaded lower end 59 of the ram 24 is screwed.

Extending upwards from the plate forming the floor 16 of the box, parallel to the axis of the ram 24, are four pillars 60 which support the cylinder 23. As shown, the cylinder is formed at its lower end with a flange 61 through which threaded ends of the pillars pass, the flange being clamped to the pillars by nuts 62. The cylinder 23 is provided at its upper and lower ends with respective pressure fluid connectors 63 and 64. At its upper end the cylinder is also provided with a pressure sensing connector 65 referred to hereinafter. Secured to the stuffing box 66 of the ram 24 by means of grub screws 67 is a collar 68 on which is mounted, by means of screws 69, a push-button valve 70, also referred to below. The valve is arranged to be opened by the engagement with the push-button of a screw 71 which is screwed into the top of the block 53 and which affords adjustment of the position of the plunger 22 at which the valve 70 is operated.

Figure 5:
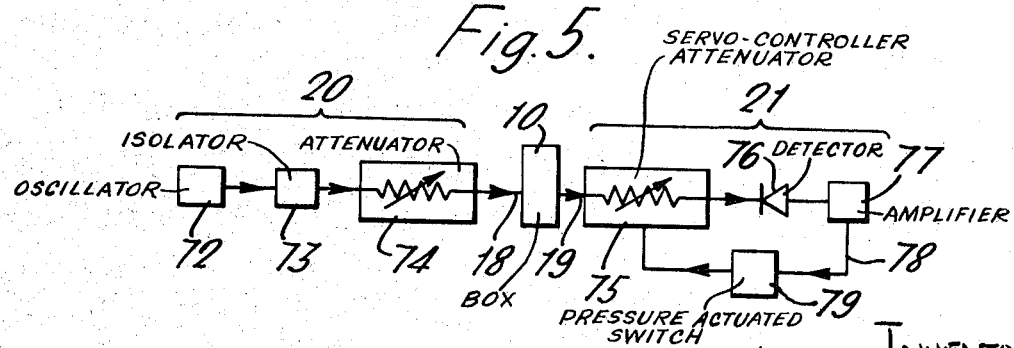
FIG. 5 is a block diagram of the U.H.F. measuring system.

The apparatus for subjecting compacted samples in the box 10 to U.H.F. radiation is shown in block diagram form in FIG. 5. The apparatus 20 comprises a klystron oscillator 72 to produce approximately 22 milliwatts at 10,000 megacycles, an isolator 73 and a conventional attenuator 74. The input from the oscillator 72 is passed to the isolator 73 to prevent any reflections of micro-wave power from affecting the oscillator 72 during operation. The power is then passed through the attenuator 74 which consists of a strip of insulating material whose position in the waveguide determines the amount of power absorbed in the attenuator itself. The attenuator is used to pre-set the level of the microwave power fed to the box 10 via the waveguide 18.

The output from the box 10 is taken through the other waveguide 19 to the power loss detector 21 which includes a servo-controlled attenuator 75, a detector 76 and an amplifier 77, the output taken through the waveguide 19 being passed through the servo-controlled attenuator 75 and then to the detector 76 and amplifier 77 which is coupled through a feed-back loop 78 containing a pressure-actuated switch 79, referred to hereinafter, as the attenuator 75.

The input power is modulated at, say 3.2 kilocycles per second so that the detector 76 feeds an audio signal at 3.2 kilocycles to the amplifier 77. Any changes in level of this signal wil cause the servo-controlled attenuator 75 to move in such a manner that the signal at the detector 76 returns to its previous level.

When the box 10 is filled with sand compressed to substantially constant packing density, the sand absorbs microwave power to an extent which depends on the moisture content of the sample. With few exceptions, no absorption will take place when dry material is placed in the box 10 and, therefore, the only attenuating medium present will be water. The exception to this in the case of foundry sands is when coke is present, as this will tend to absorb some power.

The change in level of water content in the sand sample cannot be determined by measuring the voltage output at the detector 76, the change in power at the detector bearing little relationship to its voltage output, since even though the detector follows an approximate square law, this relationship changes with changes in power level. It has been found that when the change in power level passing through the specimen is measured in decibels, this is directly proportional to the water content of the sand within the box 10. The response of the attenuators 74, 75, is very nearly linear with attenuation in decibels, so that the movements of these attenuators can be related directly to the water content of the sand. In order to control the addition of water to any system, or to indicate water content, it is only necessary to sense the linear movement of the servo-controlled attenuator 75 in any conventional manner.

As regards foundry sands containing coke, the coke content is not normally allowed to rise above about 3%, and in such a case the error in measurement of moisture content may be expected to be small, say 0.5% or less. Moreover, in practice, any change in the value of coke content will occur slowly, for example, 0.5% per month. The correction factor for the instrument readings is therefore very small.

Figure 6:
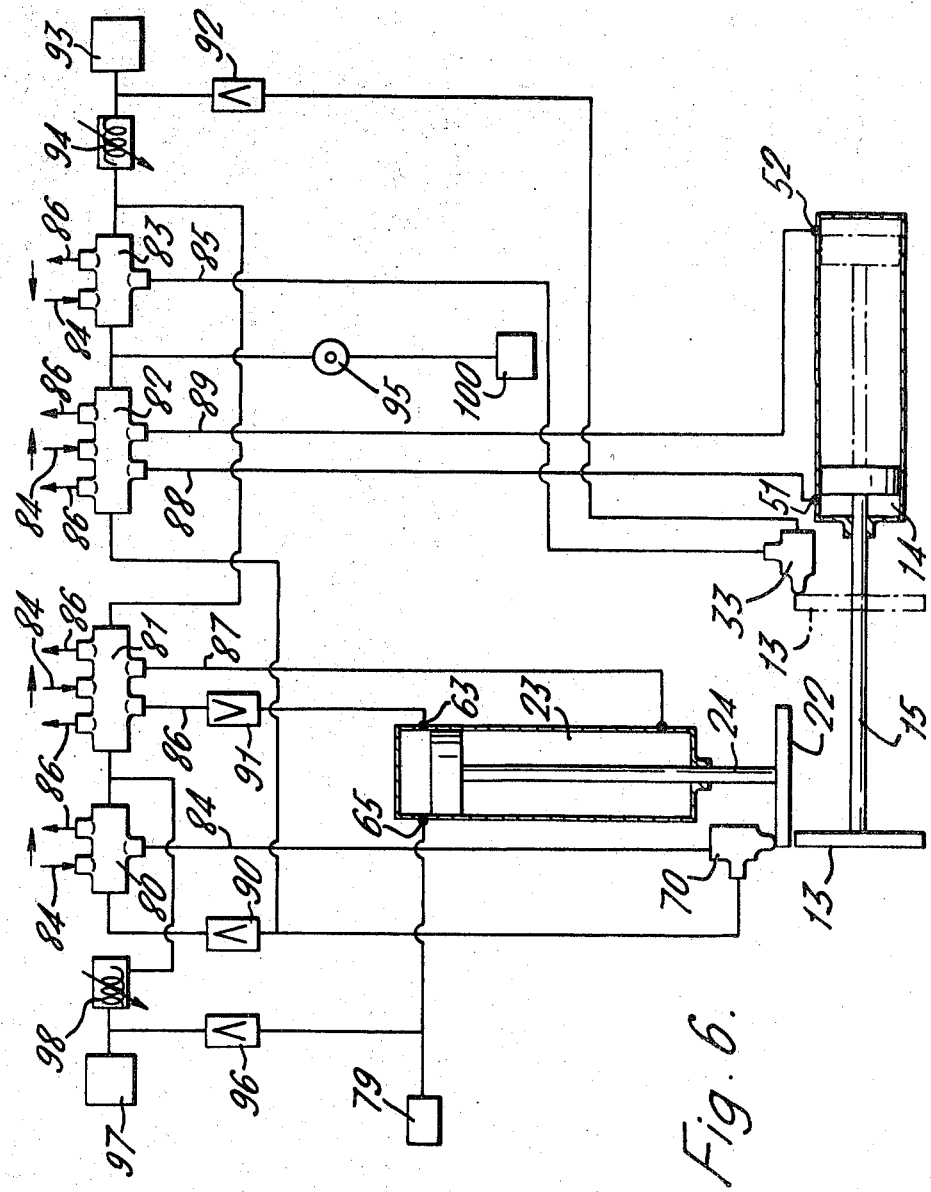
FIG. 6 is a diagram of the control system for effecting sequential operation of the mechanism of FIGS. 2–4.

In the automatic sequential control system of FIG. 6 four air valves 80, 81, 82 and 83 of the spool type are provided. Normally the spools of the valves 80, 81 and 82 are in their right-hand positions as indicated by arrows in FIG. 6, whilst the spool of the valve 83 is in its left-hand position. The spool of each valve is adapted to be moved to its alternative positions by the admission of pressure fluid to the one or other end of the housing or cylinder in which the spool works. The valves are connected by inlet lines 84 to a source 100 of compressed air and to exhaust lines 86. The valves 80 and 83 have each a single inlet or outlet line 84 or 85 whilst the valves 81 and 82, which act as reversing valves, have respectively two inlet or outlet lines 86, 87 and 88, 89. The line 84 is connected by way of the valve 70 and a restrictor 90 to the left-hand end of the cylinder of the valve 80 and also by way of the valve 70 to the left-hand end of the cylinder of the valve 82. The line 86 of the valve 81 is connected through a restrictor 91 to the pressure fluid connector 63 (FIGS. 2 and 3) and the line 87 is connected to the pressure fluid connector 64 (FIGS. 2 and 3) of the cylinder 23. The lines 88 and 89 of the valve 82 are connected respectively to the pressure fluid connectors 51 and 52 (FIG. 2) of the cylinder 14. The line 85 of the valve 83 is connected by way of the valve 33 (FIG. 2) and a restrictor 92 to a reservoir 93 and to the right-hand end of the cylinder of the valve 83 through a normally closed pressure-actuated valve 94. The source 100 of compressed air is also connected through a manually or automatically operated starting valve 95 to the right-hand end of the cylinder of the valve 82 and to the left-hand end of the cylinder of the valve 83. The pressure sensing connector 56 of the cylinder 23 (FIG. 3) is connected through a restrictor 96 to a reservoir 97 and by way of a normally closed pressure-operated valve 98 to the right-hand end of the cylinder of the valve 80 and the left-hand end of the cylinder of the valve 81. The connector 65 is is also connected to the normally open pressure-operated switch 79.

In operation, when the plunger 13 is fully advanced to close the entry to the box 10 and the plunger 22 is fully retracted, and the starting valve 95 is operated, a pulse of air is applied to the valves 82 and 83 so that the spools of these valves move to their left-hand and right-hand positions respectively. As a result, the valve 33 is connected to the source 100 and air under pressure is supplied to the front end of the cylinder 14, whilst the rear end is connected to exhaust. Consequently the plunger 13 is retracted.

When the plunger reaches its fully retracted position it opens the valve 33, with the result that air under pressure is supplied through the restrictor 92 to the reservoir 93. The pressure takes a finite time to build up to the value at which the value 94 is operated, and this delay enables the box 10 to become filled with sand.

When the valve 94 eventually operates, air under pressure is supplied through to the valve to the right-hand ends of the cylinders of the valves 81 and 83 so that the spools of these valves move to their left-hand positions. Air pressure is therefore removed from the valve 33 and the arrangement is such that air within the reservoir 93 bleeds away and the pressure applied to the valve 94 drops.

Movement of the spool of the valve 81 to its left-hand position results in the supply of air to the pressure fluid connection 63 of the cylinder 23 and the connection of the pressure fluid connector 64 to exhaust. Consequently the plunger 22 is forced downwards within the box 10 at a rate governed by the restrictor 91 to compress the charge of sand within the box.

Air under pressure from the upper end of the cylinder 23 flows through the restrictor 96 to the reservoir 97 and the pressure-operated valve 98, and when the plunger 22 presses on the charge of sand the pressure in the reservoir builds up until the valve 98 opens to admit air under pressure to the right-hand end of the cylinder of the valve 80 and the left-hand end of the cylinder of the valve 81 to move the spools of these valves to their left-hand and right-hand positions respectively. The delay afforded by the restrictor 96 enables a measurement of the moisture content of the compressed sand to be made before the sequence is continued.

The movement of the pool of the valve 80 to its left-hand position results in the admission of air under pressure to the valve 70, whilst movement of the spool of the valve 81 to its right-hand position results in connection of the pressure fluid connector 64 to the supply of air under pressure and the connection of the pressure fluid connector 63 to exhaust. The plunger 22 is therefore moved to its fully retracted position. When the plunger reaches this position it operates the valve 70 which opens to supply air under pressure to the left-hand end of the cylinder of the valve 82, the spool of which is therefore moved to its right-hand position. Air is also supplied through the restrictor 90 to the left-hand end of the cylinder of the valve 80, the spool of which therefore moves, with a time delay sufficient to ensure operation of the valve 82, to its right-hand position. The supply of air is thus cut off from the valve 70. The arrangement is such that air in the reservoir 97 then bleeds away to atmosphere.

The operation of the valve 82 results in connection of the pressure fluid connector 52 of the cylinder 14 to the supply of air under pressure and the connection of the pressure fluid connector 51 to exhaust. The plunger 13 is therefore advanced to the position in which it closes the sand entry aperture at the front end of the box 10 and the opening in the wall of the sand container in register therewith.

The system will then stay at rest until the press-button valve 95 is again depressed, whereupon the cycle of operations will be repeated.

The normally open switch 79 in FIGS. 5 and 6 serves to avoid unnecessary movement of the servo-controlled attenuator 75 when the box 10 is empty. When, however, the air pressure in the upper part of the cylinder 23 rises to a predetermined value the switch 79 closes to enable the measurement of moisture content of the sand sample in the box to be made.

If the pressure of the sand in the source 12 is too low to ensure adequate filling of the cell when the plunger 13 is retracted, the base of the box 10 may be inclined downwards to assist in this filling operation. Whilst an angle of 30° below the horizontal will normally suffice for most foundry sands, it is to be understood that there is no special limit to this angle, and if it is more convenient in any given case the box 10 may be mounted so that the dimension *l* is vertical and the dimension *h* is horizontal.

By returning the charge to the source, no significant loss of sand in the system is involved.

The plungers 13 and 22 may be actuated by other means than the pressure fluid motors 14, 23. For example, the rams 15 and 24 may be threaded to engage in captive rotary thrust nuts driven by electric motors or the like.

The method of measurement according to the present invention is simple, effective, and relatively quick, and the adoption of power loss measurement at maximum packing density affords a simple and accurate determination of moisture content. Furthermore, no complicated seals on the plungers 13, 22 are necessary and all motions of the loading and discharge plunger are carried out at ambient pressure within the cell.

I claim:

1. An hygrometer for measuring the moisture content of granular material, an electrical characteristic of which, when the material is compressed to a substantially constant density, varies as a known function of the moisture content of the material, comprising a cell of uniform cross-section formed with an open end defining an aperture for the entry into and discharge from the cell of a single sample of said granular material, a loading and discharge plunger reciprocable within the cell between a fully advanced position in which said plunger closes said aperture and a fully retracted position in which said plunger defines the back wall of the cell remote from said open end, first reciprocating means adapted to reciprocate said loading and discharge plunger, a compression plunger for displacement in a direction inclined at an angle greater than an acute angle to the direction of reciprocation of said loading and discharge plunger and having a normal position in which it defines a boundary of said cell and displaceable inwardly from said normal position when said loading and discharge plunger is in its fully retracted position and the cell contains a sample of said material to compress the sample to said substantially constant density, compression plunger operating means for displacing said compression plunger inwardly from said normal position and withdrawing the compression plunger to said normal position, means for applying electrical energy to material of a sample compressed within the cell and measuring means responsive to variations of said electrical characteristic in said material within the cell.

2. An hygrometer according to claim 1, wherein said cell is in the form of a long, narrow box of rectangular cross-section, the boundaries of which are defined by the loading and discharge plunger when in its fully retracted position, the compression plunger when in its normal position, narrowly spaced opposed side plates and a member extending between the said plates opposite the compression plunger.

3. An hygrometer according to claim 2, wherein said applying means includes means for projecting a beam of microwave electrical energy across the cell adjacent the discharge plunger when in its fully retracted position and in which said measuring means includes means for measuring power loss in the said beam due to absorption by the moisture in material within the cell compressed to substantially constant density.

4. An hygrometer according to claim 1, wherein said applying means includes means for projecting a beam of microwave electrical energy across the cell and in which said measuring means includes means for measuring power loss in the said beam due to absorption by moisture in material compressed to substantially constant density within the cell.

5. An hygrometer according to claim 1, suitable for use in determining the moisture content of samples of granular material derived from a source within a vessel having a wall formed with an opening for the passage of said samples, comprising mounting means holding the hygrometer to said wall with said aperture against said opening.

6. An hygrometer according to claim 1, suitable for use in determining the moisture content of samples of granular material derived from a source in communication with the said aperture, wherein said loading and discharge plunger and said compression plunger have axes set at an obtuse angle to one another and said cell the bottom of which, when the axis of the compression plunger extends upwardly from the cell in an upright direction, slopes downwardly from the said aperture parallel to the axis of the loading and discharge plunger.

7. An hygrometer according to claim 1, comprising power means for actuating the loading and discharge plunger, power means for actuating the compression plunger and an automatic sequential control system including sequence initiating means and control devices for the said power means, the said control system, upon actuation of the sequence initiating means, effecting in sequence movement of the loading and discharge plunger from the fully advanced to the fully retracted position to admit a sample of granular material to the cell, movement of the compression plunger from the retracted position to a position in which material of the sample is compressed to said substantially constant density and then, after measurement of moisture content of said sample, movement of the compression plunger back to its retracted position to relieve pressure on said sample and movement of the loading and discharge plunger back to its fully advanced position to eject said sample from the cell.

References Cited

UNITED STATES PATENTS

| | | | |
|---|---|---|---|
| 2,343,340 | 3/1944 | Stevens | 324—61(CP)UX |
| 2,520,394 | 8/1950 | Franzen-Lutz et al. | 324—65(CP)UX |
| 3,348,140 | 10/1967 | Godding | 324—58.5 |
| 3,360,721 | 12/1967 | Pullman | 324—58.5 |

EDWARD E. KUBASIEWICZ, Primary Examiner